(12) United States Patent
Cleff

(10) Patent No.: US 11,399,683 B2
(45) Date of Patent: Aug. 2, 2022

(54) CANISTER VACUUM CLEANER WITH BATTERY-POWERED FLOOR NOZZLE

(71) Applicant: Marcus Cleff, Cologne (DE)

(72) Inventor: Marcus Cleff, Cologne (DE)

(73) Assignee: WESSEL-WERK GMBH, Reichshof-Wilbergerhuette (DE)

( * ) Notice: Subject to any disclaimer, the term of this patent is extended or adjusted under 35 U.S.C. 154(b) by 189 days.

(21) Appl. No.: 16/864,202

(22) Filed: May 1, 2020

(65) Prior Publication Data

US 2021/0338030 A1 Nov. 4, 2021

(51) Int. Cl.
- *A47L 9/28* (2006.01)
- *A47L 5/36* (2006.01)
- *A47L 9/04* (2006.01)
- *A47L 9/24* (2006.01)
- *A47L 9/10* (2006.01)

(52) U.S. Cl.
CPC ............ *A47L 9/2884* (2013.01); *A47L 5/362* (2013.01); *A47L 9/0411* (2013.01); *A47L 9/102* (2013.01); *A47L 9/248* (2013.01); *A47L 9/2847* (2013.01)

(58) Field of Classification Search
None
See application file for complete search history.

(56) References Cited

U.S. PATENT DOCUMENTS

| | | | | |
|---|---|---|---|---|
| 3,226,758 | A * | 1/1966 | Brown ................. | A47L 5/26 15/327.1 |
| 8,252,441 | B2 * | 8/2012 | Planck ............... | H01M 50/213 429/96 |
| 2007/0180648 | A1 * | 8/2007 | Andrup ............... | A47L 9/2857 15/339 |
| 2016/0058255 | A1 * | 3/2016 | Kim .................. | A47L 9/02 15/327.1 |
| 2018/0242802 | A1 * | 8/2018 | Fard Rahmani ...... | A47L 9/2868 |
| 2019/0029485 | A1 * | 1/2019 | Zhang ................ | A47L 9/24 |
| 2021/0244251 | A1 * | 8/2021 | Geurden .............. | A47L 9/102 |

FOREIGN PATENT DOCUMENTS

| | | | |
|---|---|---|---|
| JP | 200347577 | B | 2/2003 |
| JP | 2003047577 | A * | 2/2003 |

\* cited by examiner

*Primary Examiner* — Joseph J Hail
*Assistant Examiner* — Dana Lee Poon
(74) *Attorney, Agent, or Firm* — Andrew Wilford

(57) ABSTRACT

A vacuum cleaner has a nozzle with an electric motor and a cleaning device driven thereby. A separate suction unit has an electric fan for drawing in air and a collector for separating dust from the drawn-in air. A suction conduit extends between the nozzle and the suction unit so the electric fan draws air and dust in through the nozzle, pulls it through the conduit, and separates the dust from the air in the collector. The conduit further has a rigid pipe having an outer end connected to the nozzle and an opposite inner end and a flexible hose connected between the inner end and the suction unit and opening into the collector. A power unit for the nozzle motor has a housing mounted on the pipe, a lithium-ion battery contained in the housing, and a control contained in the housing and operating the electric motor of the nozzle from the battery.

13 Claims, 4 Drawing Sheets

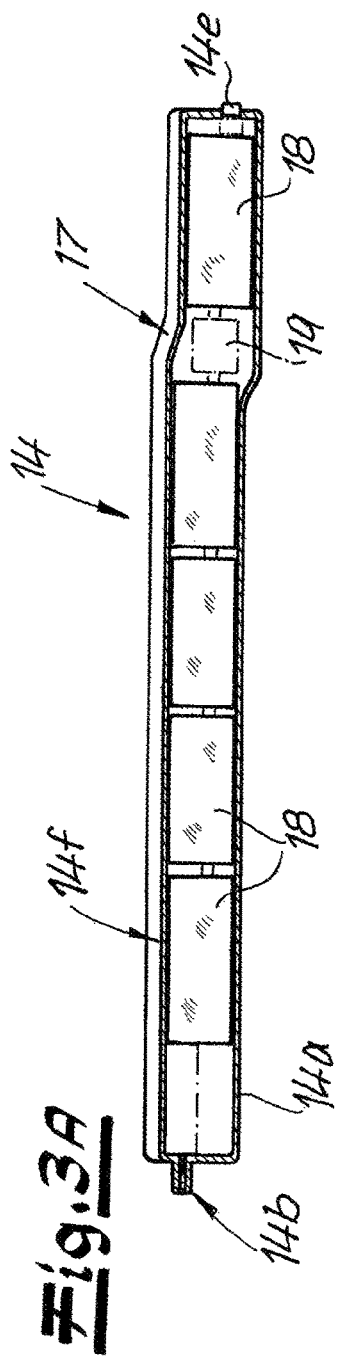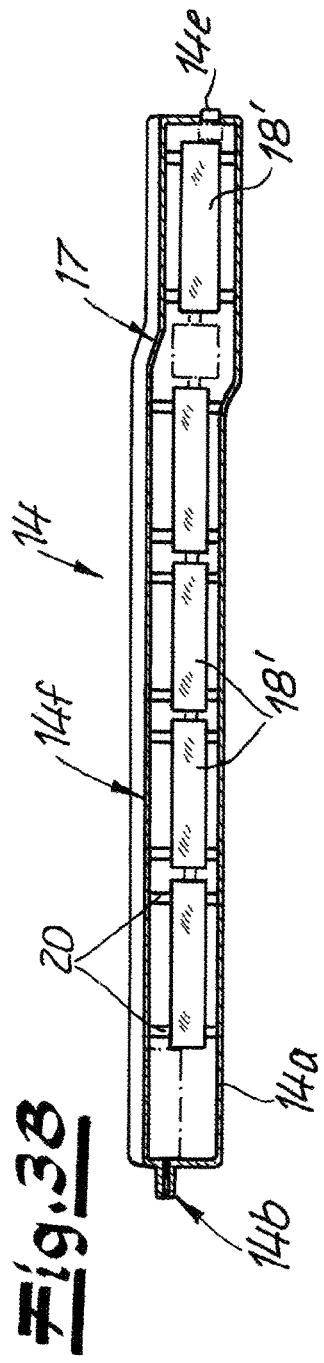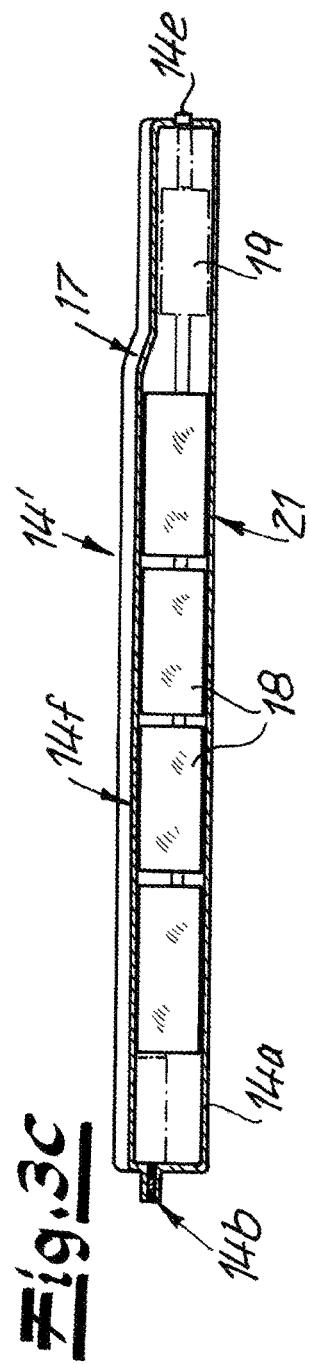

CANISTER VACUUM CLEANER WITH BATTERY-POWERED FLOOR NOZZLE

FIELD OF THE INVENTION

The present invention relates to a vacuum cleaner. More particularly this invention concerns a canister vacuum cleaner with a powered floor nozzle.

BACKGROUND OF THE INVENTION

The invention relates to a vacuum comprising a nozzle, a canister or suction unit and a suction conduit between the nozzle and the canister.

The suction unit has a fan for drawing in air and a collector for separating dirt particles entrained in the suctioned air stream. The collector may preferably be a filter bag, a partially air-permeable filter element such as a filter pad for example, or a foam filter and/or a cyclone filter.

Conventional vacuum cleaners of this type only permit the removal of dirt particles that are loose on a surface to be cleaned, in particular, a floor surface, or that can be easily detached by air movement. To this end, it is also known to provide an electrically powered cleaning device in the nozzle to pick up dust. This can be a driven brush roller in particular.

In order to connect the flow from the nozzle to the canister, there is a suction conduit having a suction pipe that is detachably connected to the nozzle. This proven arrangement is particularly advantageous with regard to the handling of the nozzle since the nozzle can be guided by the suction pipe independent of any movement of the canister.

However, this kind of suction conduit is problematic with regard to supplying energy to the electric drive of the cleaning device in the nozzle. Since the nozzle can be connected to and removed from the suction pipe in modular fashion, for safety reasons power should not be supplied directly to the nozzle. Even low-voltage power to the nozzle from the vacuum cleaner is problematic. Due to the long line length, appreciable heat generation and line losses can be expected. Also, cable guides running along a suction hose, for example, always pose the danger of cable breaks due to frequent flexing of the suction hose. The only way to counteract this is by using extremely costly stranded-copper lines, and this can be uneconomical in the context of a vacuum cleaner.

In consideration of this, it has been proposed, for example in JP 2003-047577, to provide a removable battery unit in the nozzle, the battery unit extending parallel to the suction pipe due to its size and weight. Due to the low energy capacity and the hence necessarily frequent exchanging or charging, the battery unit is designed to be exchangeable. Because of the disadvantages described, no such design has ever been put on the market.

OBJECTS OF THE INVENTION

It is therefore an object of the present invention to provide an improved canister vacuum cleaner with battery-powered floor nozzle.

Another object is the provision of such an improved canister vacuum cleaner with battery-powered floor nozzle that overcomes the above-given disadvantages, in particular that overcomes the problems of existing known designs are to be overcome.

SUMMARY OF THE INVENTION

A vacuum cleaner has according to the invention a nozzle having an electric motor and a cleaning device driven by the motor. A suction unit or canister has an electric fan for drawing in air and a collector for separating dust from the aspirated air. A suction conduit extends between the nozzle and the suction unit so the electric fan draws air and dust in through the nozzle, pulls it through the conduit, and separates the dust from the air in the collector. The conduit has a rigid pipe having an outer end connected to the nozzle and an opposite inner end to which may be connected a flexible hose extending to the suction unit and opening into the collector. A power unit for the nozzle motor has a housing mounted on the pipe, a lithium-ion battery contained in the housing, and a control contained in the housing and operating the electric motor of the nozzle from the battery.

By using a charging and discharging controller in connection with at least one electrical storage cell based on lithium ion technology, it is possible to maintain electrical energy storage capacities in an order of magnitude sufficient for conventional application scenarios. The energy content and energy efficiency are high enough in this case that it is not necessary to exchange the power unit or to recharge it during cleaning. As a result, the power unit can be fixed to the suction pipe in a very user-friendly and safe manner. Any sources of error due to incorrect installation are thus reliably ruled out. The connection between the power unit and the suction pipe is designed such that a user cannot disconnect it, in particular not without a special tool. Thus, there is no danger of detaching components due to incorrect operation or inadvertently. On the other hand, the option remains open to a trained electrician to disassemble the components in order to carry out repairs or maintenance work.

The invention can be applied to different types of vacuum cleaners. For example, the vacuum cleaner can be designed as a canister cleaner in particular, having a separate canister, an upright cleaner having a suction unfit on the suction pipe, or a stick cleaner having a battery-operated hand-held suction unit plugged onto the suction pipe and directly connected thereto.

According to a variant of the invention, the suction conduit further has a suction hose that connects the suction pipe to the vacuum cleaner. This must be provided for canister cleaners in particular. This is also useful in combination with a vacuum cleaner designed as a central vacuum cleaning system where the suction unit is relative remote. The end of the suction hose that can be connected to the suction pipe can also be designed as a rigid handle piece in particular.

In a preferred embodiment of the invention, the power unit contains a plurality of electrical storage cells of the same type. By using a plurality of storage cells, on the one hand a higher amount of energy can be maintained in the power unit. To accomplish this, the electrical storage cells can on the one hand be connected electrically in series in order to achieve higher output voltages. On the other hand, a parallel circuit is also possible so as to maintain higher current levels. Combinations are also possible. In particular, the electrical storage cells can be standard cell types as are offered by various suppliers on the market and are therefore readily available.

Preferably, the controller can also have other functions. It is especially preferable to provide monitoring of the maintenance state (battery health) of the electrical storage cells and/or a temperature monitoring of the individual storage cells. In particular, in dependence on this the controller can do load distribution (load balancing) between the individual storage cells. This ensures a long service of the power unit, even if it is used regularly, along with uniformity in the quality of the operational properties (i.e. output voltages and current levels).

According to another preferred aspect of the invention, the at least one electrical storage cell is selected from at least a first type of storage cell that contains at least one lithium-ion battery and optionally a second type of electrical storage cell that contains at least one lithium-ion battery. Thus, during manufacture the electrical power unit can be loaded with storage cells in a varying fashion, with different performances and costs depending on use requirements and on customer specifications. The housing and the controller therein remain unchanged.

According to the second aspect of the invention, the storage cell of the second type is designed smaller than the storage cell of the first type. Here, in a configuration with electrical storage cells of the first type, the cells are fitted snugly in the housing and positively locked. The dimensions of the housing in this case are tailored to the dimensions of the storage cells of the first type such that a tight fit results directly. In a second configuration with the second type of electrical storage cells, a spacer is between a storage cell and the internal surfaces of the housing. The spacer enables use of physically smaller storage cells of the second type and secures them against any unwanted movement inside the housing. The fact that the same housing and controller components can be used both in the first configuration (with the first type of storage cells) and in the second configuration (with the second type of storage cells) results in cost advantages in manufacturing and development. At the same time, a certain degree of recognition of the product can be achieved due to uniform external appearance of the power unit. Also, by suitably selecting the number and type of electrical storage cells, it is possible to flexibly adapt the product to the targeted market segment and to the required performance data.

It is especially preferable that the storage cells may further be selected from at least a third type of electrical storage cells that also contain a lithium-ion battery. Further, the third type is designed to be smaller or thinner than the second type. In a configuration with at least one electrical storage cell of the third type, at least one second spacer element is positively locked between this storage cell and the inside the housing. This variant expands the product portfolio by at least a third type (and optionally other types) of electrical storage cells so as to be able to cover an even greater scope of application.

It is preferable for the contour of the housing to be adapted to the outer shape of the suction pipe. Thus, in the final installed state very close contact between the power unit and the suction pipe results. This is advantageous on the one hand for providing good force transfer due to positively locked abutment of opposing outer surfaces. This also makes a very compact design possible, which allows the gap between the housing of the electrical power unit and the suction pipe to be minimized and at the same time allows the volume available inside the housing to be maximized. In this design, the power unit and the suction pipe are also stabilized and mutually mechanically protected on the outside.

It is preferable for the suction pipe to comprise at least a part-cylindrical and convex outer surface with a first radius of curvature. The housing has a complementary cylindrical shell section-shaped concave inner surface having this first radius of curvature that sits flat in surface contact against outer surface. The inner surface and the outer surfaces are not separated by the user when used as intended.

It is preferable for the suction pipe to comprise an outer tube section and an inner tube section that can be inserted into the outer tube section telescopically. Here, the housing is fastened to the outer tube section.

A telescopic, two-part suction pipe made of two tube sections makes it possible to adjust its length. This allows a user to flexibly adjust the distance between the nozzle and the inner end of the suction pipe, the end at which the vacuum cleaner is normally guided. In the process, a latch in particular (or a telescope mechanism) is provided that establishes the relative position between the outer tube section and the inner tube section. This latch may contain a clamp or a latch in particular. This latch locks the outer tube section and the inner tube section relative to one another in various discrete positions. In the process, a positive locking in particular is provided, which cannot be overcome by traction or compression forces. To the contrary, the latch contains at least one release element whose activation allows the positive locking (i.e. "latch-locking") to be released. This mechanism is preferred to be a pushbutton or a sliding switch. The control element is preferably on the outside of a tube section, in particular on the outside of the outer tube section.

In order to keep the weight distribution of the vacuum cleaner as favorable as possible, it is preferable that the outer tube section with the power unit fixed thereon to be in the outer area directly adjacent to the nozzle. This makes electrical contacting between the power unit and the nozzle easier.

It is especially preferred for the outer tube section to comprise an outer part with a first diameter and an inner part with a second diameter. In the process, the second diameter is designed to be greater than the first diameter. The outer part extends over at least 75% of the length of the outer tube section. The length of the outer tube section is measured in the direction of extension thereof, i.e. In the direction of flow of the suction air stream or in the longitudinal direction of the suction pipe. The outer section is in particular provided to hold a suitable latch in the additional space made available by the diameter enlargement, in particular a latch, for adjusting the relative position between the outer tube section and the inner tube section.

It is especially preferable for the housing to sit against the outer tube section both at the outer and inner parts. In the process, the housing has a step that is shaped to fit with the outer wall of the outer tube section in the area of the change in diameter of the outer part to the inner part. The adjustment to the stepped outer contour of the first tube makes optimum utilization of the overall length of the outer tube section possible. This allows an especially large and simultaneously closely abutting construction of the housing.

In the process, it is possible that in the housing of the power unit an outside surface opposite to the abutting surface of the housing forms a corresponding contour such that the inside space of the housing has a substantially constant height. This makes it possible for electric storage cells to extend along the entire length of the electric storage unit.

According to another variant of the invention, the housing has a narrowing in the area of the step. In particular, the outside surface opposite to the abutting surface can be designed to be substantially straight. Based on the reduced design space adjacent to the inner part of the outer tube section, an electrical storage cell can be disposed there but to a limited degree. To the contrary, it is then preferable for the electrical storage cells to be exclusively adjacent the outer part and the controller to be exclusively adjacent the inner part. This also advantageously shifts the center of mass, which is mainly determined by the heavy batteries, downward. At the same time, the control elements (switches, charge state display, charging socket) can be positioned closer to the user.

Another aspect of the invention relates to the mounting of the power unit on the suction pipe, in particular on the outer tube section, at an outer end by an outer mount and at an inner end by an inner mount, the inner end being separated from the outer end. Otherwise, the suction pipe and the power unit are not interconnected between the mounts.

In particular, this involves functioning components that are completely separate from one another, the suction pipe being completely closed and the power unit being encapsulated. This is advantageous for safety, contamination and hygiene reasons. The outer mount and the inner mount in particular can be designed as collar clamps.

It is preferable for the outer mount to comprise an outer hole through which the suction pipe extends and in which is fixed. Further, the outer mount has an outer cap in which the outer end of the housing is held and solidly secured. The inner mount has an inner hole through which the suction pipe extends and where it is locked in place. It further has an inner cap in which the inner end of the housing is secured. It is especially preferred that no connection whatsoever is provided between the outer mount and the inner mount on the one hand and the power unit on the other hand, other than the positively locked support, i.e. in particular there is no screwed, welded or adhesive connection provided there. On the one hand, this simplifies the manufacturing process and on the other hand can also be advantageous for any disassembly or repair work.

It is preferable for the housing to comprise an inner electrical connector at the outer end, in particular a plug or spring contact, the connector extending through the outer mount and being detachably connected to a complementary outer connector of the nozzle. In this case, the power unit is mounted on the suction pipe in such a way that after proper installation of the nozzle on the suction pipe an electrical contact between the storage unit and the nozzle is established. This enables energy supply to be provided to the electrically powered cleaning device. The two connectors have multiple contacts for interconnecting several supply lines, and optionally control lines in particular. In particular, this enables control of the electromotive cleaning device in the nozzle by the controller in the power unit.

Alternatively, or in addition, sensor data can be transferred from measurement sensors in or on the nozzle to the controller. In particular, pressure, dust and/or light sensors may be provided inside the nozzle that detect the operating state of the vacuum cleaner and/or how dirty the surface to be cleaned is.

In an especially preferred embodiment, the inner mount is fastened on the suction pipe by the outer mount. The inner fastener is concealed and/or secured by the housing held at the inner mount. According to this variant of the invention, the inner fastener is not accessible and is not removable when the housing of the electrical storage device is located in a position held by the inner mount. This prevents the inner mount from coming loose from the suction pipe when the energy storage device is correctly installed.

The inner fastener may be a latching or screwed connection. In particular, and preferably, it can be on an inside of the inner cap. Provided that the power unit is not accommodated in the cap, an installer can access the fastener from the inside. After the outer fastener is fastened on the suction pipe, the housing of the power unit can then be pushed into the outer cap. This prevents any unintentional or malicious loosening of the inner mount. It also contributes to a pleasing visual appearance if corresponding fastener are not directly visible.

It is preferable for the telescope mechanism to be held at the outer tube section by the inner mount. The part thus serves simultaneously to fasten the power unit and also at the same time contributes to the construction and holding together of the telescoping suction pipe. This dual use makes a single fastener sufficient for fastening two necessary assemblies of the vacuum cleaner. Further, a uniform appearance can be realized, with a single plastic part.

It is especially preferred to push the outer mount in the axial direction, i.e. in the longitudinal direction of the suction pipe, onto the suction pipe and to lock it there using an outer fastener. It is especially preferred to design the outer fastener such that it cannot be loosened by an end user (inadvertently). In particular, a screwed connection with a special head can be used here. Alternatively, or additionally, a latching connection can be provided in which a latching bolt (protrusion) that is spring suspended at the suction pipe engages into an associated latching receptacle (hole) of the outer mount. In an interlocked position, the outer mount is locked at the suction pipe by the latching bolt. Here, it is preferable for the locking bolt to be accommodated surface flush to an outside surface of the outer mount. This achieves an especially uniform appearance. At the same time, the latching bolt is thereby well protected against inadvertent actuation.

The spring force of the spring suspension of the latching bolt may, in particular, be selected such that the bolt may not be pushed inward without the use of a suitable tool. Thus, it is impossible for the end user to loosen the latch connection. On the other hand, an expert maintenance or repair operation can provide for pushing in the latch bolt using a tool provided for this purpose so that the axial latch connection between the suction pipe and the outer mount is released. Then, the outer mount can be pulled out from the suction pipe in the axial direction without the use of a tool, and the electrical power unit can be removed from the positively locked suspension without loosening other fastener. In this regard, the inner fastener of the inner mount may optionally also be accessible for further disassembly.

By using the combination of a controller with at least one energy-storage cell based on a lithium-ion battery, charging is only occasionally required. To this end, the housing of the electrical power unit is preferred to comprise a charging connection. This can involve a charging socket in particular in which a charging plug, for example, a barrel plug connector, of a low-voltage charging device (in particular at voltages of less than 30 V) can be inserted. Alternatively, or in addition, it is also possible to charge using a special charging station. To this end, contact surfaces can also be on the outside of the housing, the contact surfaces coming into contact with associated charging contacts of the charging station when the suction pipe and the storage unit fixedly connected thereto is placed in the charging station.

Alternatively, or in addition, the nozzle can comprise charging contacts or charging connections that can be connected to an associated charging station or a charging cable. The charging of the electrical power unit is then done indirectly via the nozzle and the contacting means that connects the power unit to this nozzle.

To control the electromotive cleaning device, in a preferred embodiment at least one control element is on the outside of the housing. This can be used to turn the electromotive cleaning device on and off. It is also preferable for there to be different adjustable power or speed stages. Pushbutton or toggle switches, rotating or sliding controllers or pushbutton selector switches are suitable in this regard.

To better estimate the electrical energy currently available within the power unit, it is moreover optional to provide a charging state display on the outside of the housing. This indicates the current charging state of the at least one storage cell as a numerical value and/or symbolically in the form of pictograms, for example a bar display. The invention also relates to a suction pipe with an power unit thereon, as described above.

BRIEF DESCRIPTION OF THE DRAWING

The above and other objects, features, and advantages will become more readily apparent from the following description, reference being made to the accompanying drawing in which:

FIG. 3A is a section taken on section plane 3A-3A of FIG. 2B;

FIG. 3B is a view like FIG. 3A but of an alternative embodiment; and

FIG. 3C is a view like FIG. 3A but of yet another alternative embodiment.

SPECIFIC DESCRIPTION OF THE INVENTION

Figure 1:
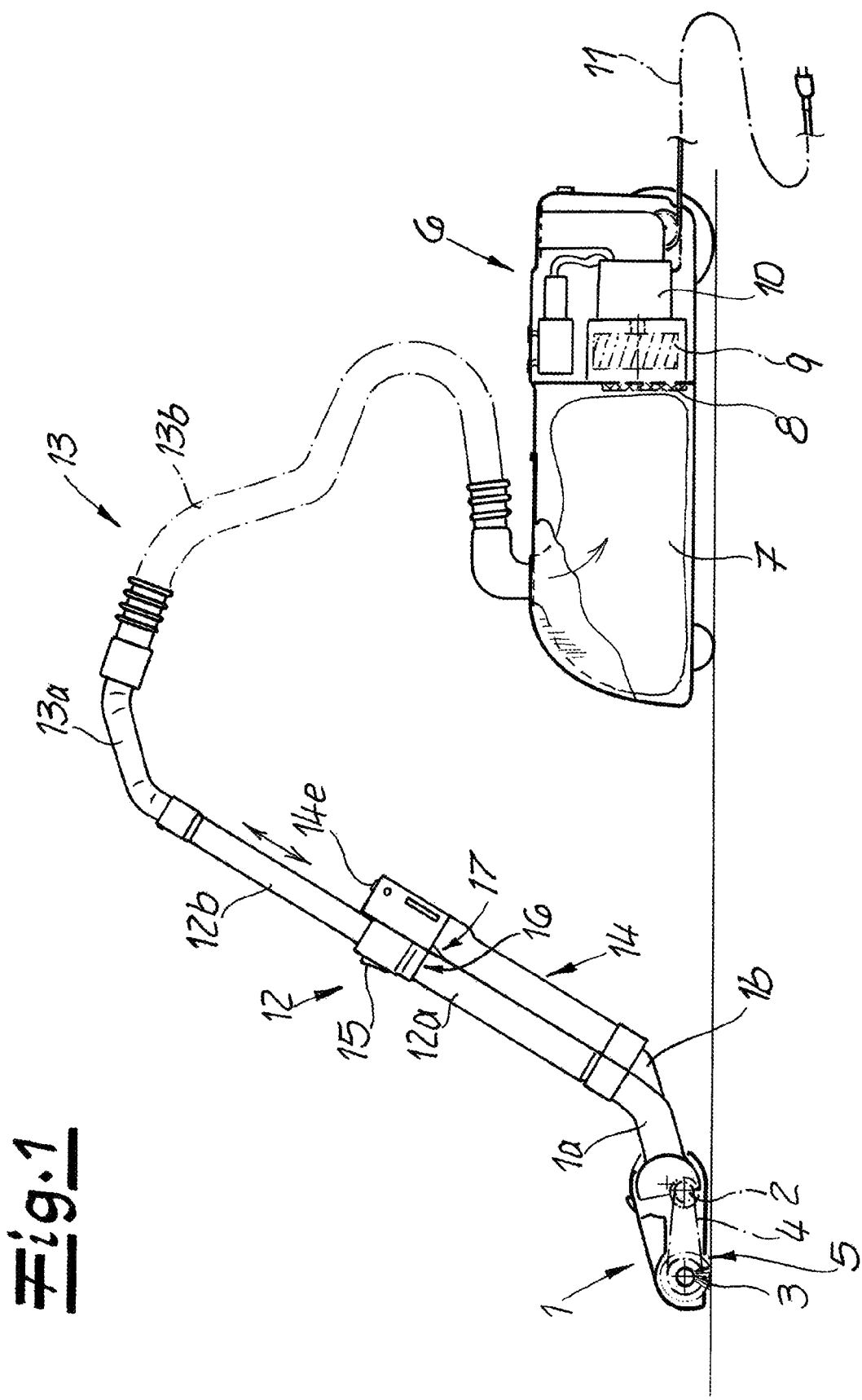
FIG. 1 is a partly sectional view of a canister-type vacuum cleaner according to the invention.

FIG. 1 shows a vacuum cleaner according to the invention. The vacuum cleaner has a nozzle 1 with an electric motor 2 and a brush roller 3 driven by the electric motor 2 via a toothed belt 4. For purposes of illustrating the nozzle 1 is shown partially in section. The base of the nozzle 1 has a suction intake 5 through which dust-laden air can be drawn into the nozzle 1.

The vacuum cleaner further has a canister 6 also shown partly in section. The canister 6 contains a dust collector with a filter bag 7 and an open-pored foam filter 8. To generate a suction air stream, a fan 9 powered by an electric drive motor 10 is provided. To drive motor 10 of canister 6 is in turn powered by a line cable 11 that can be retracted into the canister 6.

Air flow from the nozzle 1 to the canister 6 is through a suction conduit 13 that has a rigid, cylindrically tubular suction pipe 12 detachably connected to the nozzle 1 and a suction conduit 13 that connects the inner end of the suction pipe 12 to the canister 6. The conduit 13 has a rigid handle 13a and a flexible hose 13b connected thereto.

There is an electrical power unit 14 fixed on the suction pipe 12. The unit 14 provides energy to the electric motor 2 inside the nozzle 1. There is no electrical connection between the canister 6 and the nozzle 1.

Adjacent a suction connection fitting 1a of nozzle 1 into which suction pipe 12 is inserted, there is a electrical connector 1b for electrically connecting to the electrical power unit 14. To this end, the electrical connector 1b is equipped with a connector 14b described below.

Figure 2A:
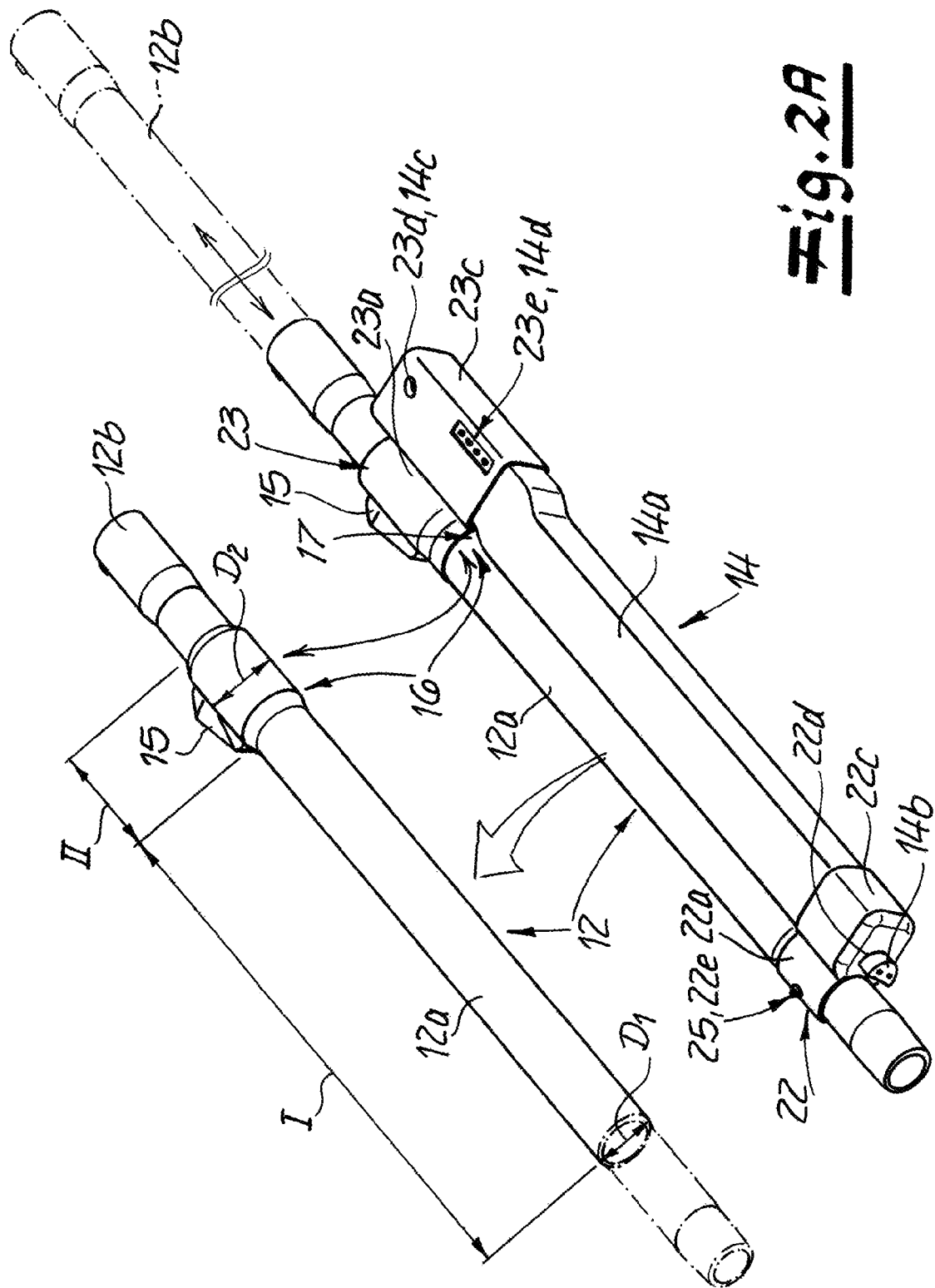
FIG. 2A is a detail view of the suction tube and power unit of the inventive vacuum cleaner.
Figure 2B:
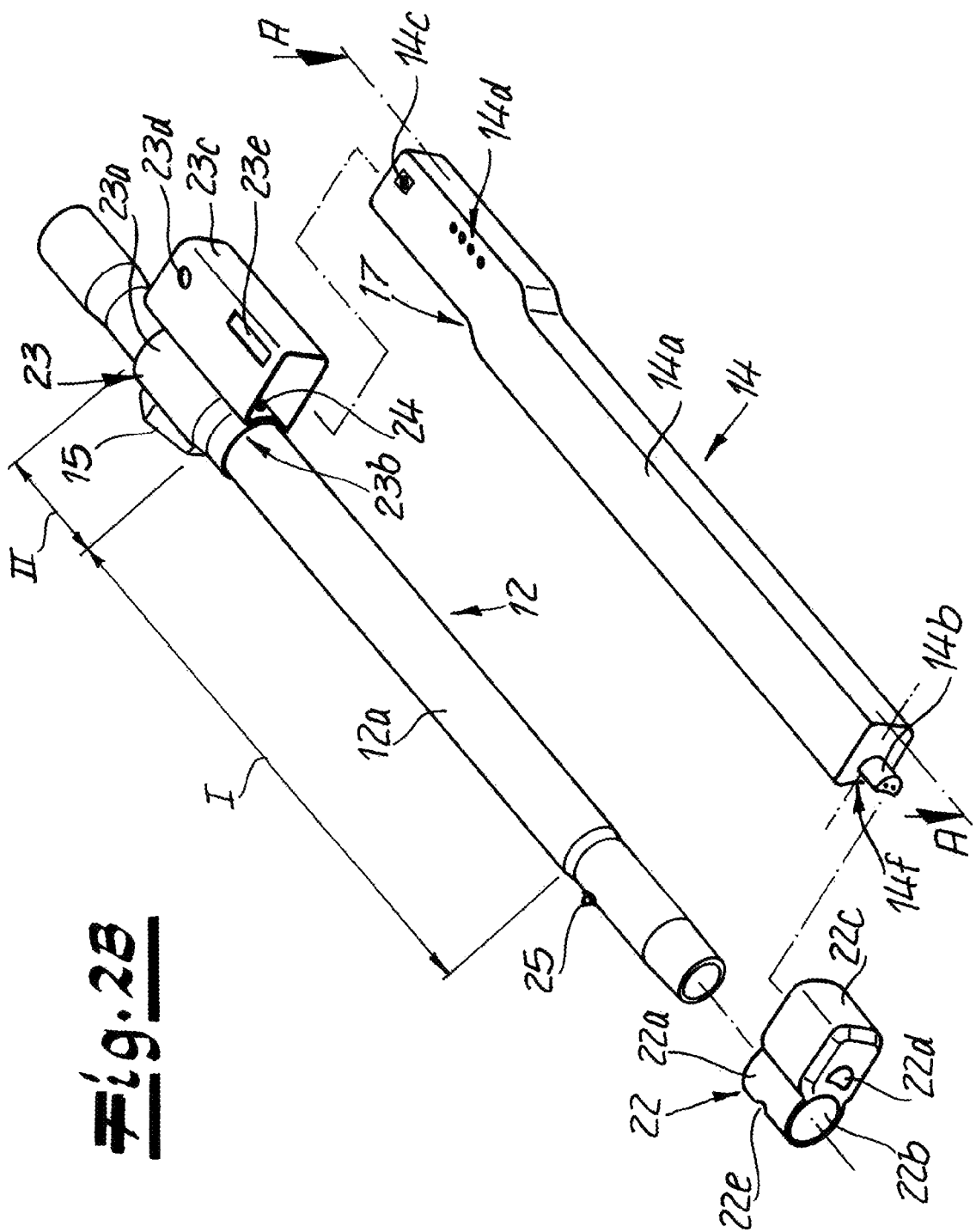
FIG. 2B shows the suction tube and power unit of FIG. 2A, but in exploded view.

The detailed design of the power unit 14 and the arrangement thereof on the suction pipe 12 is explained with the aid of FIGS. 2A and 2B. The pipe 12 has an outer tube section 12a and an inner tube section 12b that can be inserted into the outer tube section 12a telescopically. The relative position between outer tube section 12a and inner tube section 12b is fixed using a latch. This mechanism is designed to be actuated by a control element 15.

Telescoping of the sections 12a and 12b adjusts the length of the suction pipe 12 by shifting the inner tube section 12b telescopically relative to the outer tube section 12a. In FIG. 1, the maximum pulled-out position of the telescope mechanism is shown. In contrast, in FIG. 2A the suction pipe is shown in the maximum pushed-in position 20 in solid lines, the extended position being indicated with broken lines.

The outer tube section 12a of the suction pipe 12 has an outer part I with a diameter $D_1$ and an inner part II with a second diameter $D_2$. The outer section I extends over at least 75% of the length of the outer tube section 12a. In the pushed-in position (FIG. 2A), a housing 14a of the power unit 14 lies against both the outer part I and the inner part II of outer tube section 12a.

The housing 14a has a step 17 fitting with a complementary step 16 where the outer tube section 12a changes diameter. This is particularly visible in the exploded view of FIG. 2B that further shows that the shape of the face 14f of the housing 14 bearing against the pipe is complementary to the shape of the outer surface of this suction pipe 12. In addition the radii of curvature of this surface fit with the parts I and II of different outer diameters $D_1$ and $D_2$.

In the section of FIG. 3A, the inner construction of power unit 14 can be seen. Inside housing 14a there is a plurality of energy-storage cells 18 that are connected to a controller 19 that monitors and controls the charging and discharging behavior of the cells 18. Each of the cells 18 has at least one battery based on lithium ion technology. These can be so-called lithium polymer (LiPo) batteries.

The electrical storage cells 18 are selected from a first type whose dimensions are matched to the inner dimensions of housing 14a such that energy-storage cells 18 are held snugly therein. There is no additional fixing or support required.

An alternative configuration is shown in FIG. 3B. Here, energy-storage cells of a second type 18' are installed that have smaller geometric dimensions, in particular thickness, than the storage cells 18 of the first type. By using spacer elements 20, power units 18' of the second type are stored in an identical housing 14a without any consequent disadvantages. A uniform exterior appearance is ensured this way.

Another possible embodiment is seen in FIG. 3C. Here, the housing also has the step 17 adapted to the diameter change of suction pipe 12, but the opposite outer surface 21 is designed to be substantially straight. This allows the power unit 14' to be integrated to the suction pipe 12 inconspicuously. Due to the small space available in the housing 14', which is to be next to area II of suction pipe 12, none of the electrical storage cells 18 of the first type are located there, but only the controller 19 is located there.

Below, more details are provided on the fastening of the power unit 14 or 14' on suction pipe 12 in an especially preferred manner according to the invention. This is made clear in particular by a comparison of FIGS. 2A and 2B. Power unit 14 is fastened to suction pipe 12 exclusively using an outer mount 22 and an inner mount 23.

The outer mount 22 is at an outer end of the power unit 14 and near an outer end of the outer tube section 12a. Correspondingly, the inner mount 23 is positioned at an inner end of the power unit 14 and near an inner end of outer tube section 12a.

In this embodiment, the outer mount 22 has an outer collar 22a that creates an outer hole 22b for the outer part I of the outer tube section 12a. An outer cap 22c is connected to the outer collar 22 and is unitary therewith. The outer end of the power unit 14 is housed in this outer cap and positively secured by it. Correspondingly, the inner mount 23 has an inner collar 23a forming an inner hole as well as an inner cap 23c. The inner end of the energy power unit 14 is housed in this inner cap 23c.

Furthermore, the inner collar 23a simultaneously forms the end closure of the outer tube section 12a and the control element 15 reaches therethrough for the telescope mechanism. The inner mount 23 is fastened on the suction pipe 12 by an inner fastener in the form of a screw 24. Alternatively, plug or latch connectors can be used here. The screw fastener 24 is on the inside of inner cap 23c such that it is not accessible in the installed position (FIGS. 1 and 2A) when an energy power unit 14 is pushed into the cap 23c. The fastener 24 is therefore concealed and secured by the power unit 14.

Further, an electrical plug connector 14b is provided at the outer end of the power unit 14. As can be seen in FIG. 2A, this connector 14b reaches through an opening 22d of outer cap 22c. In the fully installed state (FIG. 1), the connector 14b here is in contact with the associated electrical connector 1b of the nozzle 1.

To secure the outer mount 22, a latch connection is provided between outer tube section 12a and outer mount 22. To this end, the outer collar 22a has at least one latch receptacle 22e into which a spring-loaded latch element 25 of the suction pipe 12 can reach for a positive lock. This holds the outer mount 22, which can be pushed onto suction pipe 12, on the suction pipe in a positively locked, permanent manner. Removal is nearly impossible without a special tool provided for this purpose.

To charge the power unit 14, a charging connection 14c is provided thereon. In the assembled state, this connection 14c can be accessed through a cut-out 23d in the inner mount 23. Furthermore, an inner cut-out 23e is also provided there that makes a charging state display 14d of power unit 14 visible. The operation of the electromotive drive 2, 3, 4 of the nozzle 1 is done via a pressure switch 14e in the upper area of the power unit 14, this upper area facing the user.

I claim:

1. A vacuum cleaner comprising:
    a nozzle having
        an electric motor, and
        a cleaning device driven by the motor;
    a suction unit having
        an electric fan for drawing in air, and
        a collector for separating dust from the aspirated air;
    a suction conduit extending between the nozzle and the suction unit so the electric fan draws air and dust in through the nozzle, pulls it through the conduit, and separates the dust from the air in the collector, the conduit comprising a rigid pipe having a cylindrically tubular inner section, a cylindrically tubular outer section telescoping with the inner section and having a cylindrical outer surface, and an outer end of the outer section connected to the nozzle and an opposite inner end, the outer section having a large-diameter part and a small-diameter part of smaller diameter than the large diameter part, the small-diameter part making up at least 75% of a longitudinal length of the outer section;
    a power unit having
        a housing mounted and having a part-cylindrical inner surface complementarily fitting on the outer surface of the outer section of the pipe, the housing having an outer end on the outer end of the outer section and an inner end on an the inner end of the outer section and being connected to the outer section only at the inner and outer ends thereof
        a lithium-ion battery contained in the housing, and
        a control contained in the housing and operating the electric motor of the nozzle from the battery;
    an outer mount secured to the housing and through which the outer end of the outer section projects; and
    an inner mount the secured to the housing and through which the inner end of the outer section projects, the mounts securing the housing to the outer section.

2. The vacuum cleaner according to claim 1, wherein the battery has a plurality of cells.

3. The vacuum cleaner according to claim 1, wherein the battery has a plurality of cells each comprising:
    a relatively thick first lithium-ion unit snugly fittable in the housing, or
    a second lithium-ion unit thinner than the first unit and a spacer body together snugly fittable in the housing.

4. The vacuum cleaner according to claim 1, wherein the battery has a plurality of cells each comprising:
    a relatively thick lithium-ion unit snugly fittable in the housing, or
    a second lithium-ion unit thinner than the first lithium-ion unit and a single spacer body together snugly fittable in the housing, or
    a third lithium-ion unit thicker than the second lithium-ion unit and sandwiched between a pair of spacer bodies together snugly fittable in the housing.

5. The vacuum cleaner according to claim 1, further comprising:
    a latch releasably securing the sections against relative longitudinal movement.

6. The vacuum cleaner according to claim 1, wherein the housing fits with both parts of the outer section, the outer section being formed with a step between the parts.

7. The vacuum cleaner according to claim 1, wherein the battery in the housing lies only adjacent and radially outside the small-diameter part of the pipe and the controller only lies radially adjacent and outside the large-diameter part.

8. The vacuum cleaner according to claim 1, further comprising:
    a housing electrical connector extending from the battery and control through the inner mount;
    a nozzle electrical connector complementary to the housing electrical connector, engageable therewith, and on the nozzle.

9. The vacuum cleaner according to claim 1, wherein the outer mount is fastened to the suction pipe by an inner fastener that is concealed and/or secured by the housing held at the outer mount.

10. The vacuum cleaner according to claim 1, wherein the telescoping sections are held by the inner mount to the outer tube section.

11. The vacuum cleaner according to claim 1, wherein the outer mount fits longitudinally onto the suction pipe in the axial direction and is locked in place thereon by an inner fastener.

12. The vacuum cleaner according to claim 1, wherein the conduit further comprises a flexible hose connected between the inner end and the suction unit and opening into the collector.

13. A vacuum cleaner comprising:
    a nozzle having
        an electric motor, and
        a cleaning device driven by the motor;
    a suction unit having
        an electric fan for drawing in air, and a collector for separating dust from the aspirated air;
a suction conduit extending between the nozzle and the suction unit so the electric fan draws air and dust in through the nozzle, pulls it through the conduit, and separates the dust from the air in the collector, the conduit comprising
  a rigid pipe having a cylindrically tubular inner section, and
  a cylindrically tubular outer section telescoping with the inner section and having a cylindrical outer surface, an outer end of the outer section connected to the nozzle, and an opposite inner end, the outer section having a large-diameter part and a small-diameter part of smaller diameter than the large diameter part, the small-diameter part making up at least 75% of a longitudinal length of the outer section;
a power unit having
  a housing mounted and having a part-cylindrical inner surface complementarily fitting on the outer surface of the outer section of the pipe, the housing having an outer end on the outer end of the outer section and an inner end on an the inner end of the outer section and being connected to the outer section only at the inner and outer ends thereof,
  a lithium-ion battery contained in the housing, and
  a control contained in the housing and operating the electric motor of the nozzle from the battery;
an outer mount secured to the housing and through which the outer end of the outer section projects;
an inner mount the secured to the housing and through which the inner end of the outer section projects, the mounts securing the housing to the outer section;
a controller in the housing; and
at least one electrical storage cell connected to the controller and controlled thereby, this storage cell being a lithium-ion battery.

\* \* \* \* \*